United States Patent [19]

Yoda

[11] 4,139,271

[45] Feb. 13, 1979

[54] DISPLAY DEVICE

[75] Inventor: Kazuhiro Yoda, Tokyo, Japan

[73] Assignee: Kabushiki Kaisha Daini Seikosha, Japan

[21] Appl. No.: 739,867

[22] Filed: Nov. 9, 1976

[30] Foreign Application Priority Data

Nov. 11, 1975 [JP] Japan .................. 50-135558

[51] Int. Cl.² .............................................. G02F 1/13
[52] U.S. Cl. .................................... 350/337; 350/153; 350/336
[58] Field of Search ................ 350/160 LC, 153, 337, 350/336

[56] References Cited

U.S. PATENT DOCUMENTS

| | | | |
|---|---|---|---|
| 3,538,322 | 11/1970 | Arsem | 350/153 X |
| 3,874,163 | 4/1975 | Ikeno | 350/159 X |

Primary Examiner—Edward S. Bauer
Attorney, Agent, or Firm—Robert E. Burns; Emmanuel J. Lobato; Bruce L. Adams

[57] ABSTRACT

A liquid crystal display device comprised of a liquid crystal panel unit having first and second polarizing plates disposed on opposite sides thereof. The polarizing plates have respective polarizing axes having relative orientations differing by 90°. One of the polarizing plates has a minor region having a polarizing axis oriented in parallel with that of the other of the polarizing plates. The liquid crystal panel unit has disposed thereon an electrode in registration with the minor region of the polarizing plate and which receives in use an electrical potential for independently controlling the light transmissive properties of The portion of the stacked combination of the liquid crystal panel unit and the first and second polarizing plates that is in registration with the minor region.

2 Claims, 4 Drawing Figures

DISPLAY DEVICE

BACKGROUND OF THE INVENTION

This invention relates to a display device, and particularly relates to a liquid crystal display device providing a different and interesting display effect by the use of polarizing plates having regions of different polarization axis orientation.

In the conventional type display device as shown in FIG. 1, the polarizing plates B and C for mounting a liquid crystal material A have polarizing axis B' and C' of orientations differing by 90° from each other. The direction of said polarizing axis B' and C' of said polarizing plates B and C are directed as indicated in FIG. 1.

Therefore, when an electric field is applied to the electrodes of said liquid crystal material A, only the portions to which said electric field is applied are displayed black. Therefore, in the conventional type display device, the display condition is restricted to the transparent and black conditions whereby it is impossible to display an interesting condition.

SUMMARY OF THE INVENTION

This invention eliminates the above noted difficulty and insufficiency, and the object of the present invention is to provide a new and interesting display condition in a liquid crystal display device by orienting a polarizing axis of a part of a polarizing plate relative to the polarizing axis of the rest of the same polarizing plate.

BACKGROUND OF THE DRAWINGS

DESCRIPTION OF THE PREFERRED EMBODIMENTS

Figure 1:
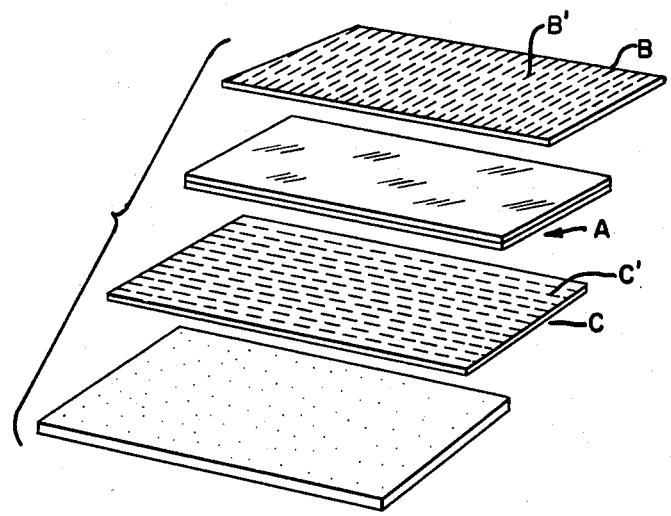
FIG. 1 shows a perspective view of a conventional display device.
Figure 2:
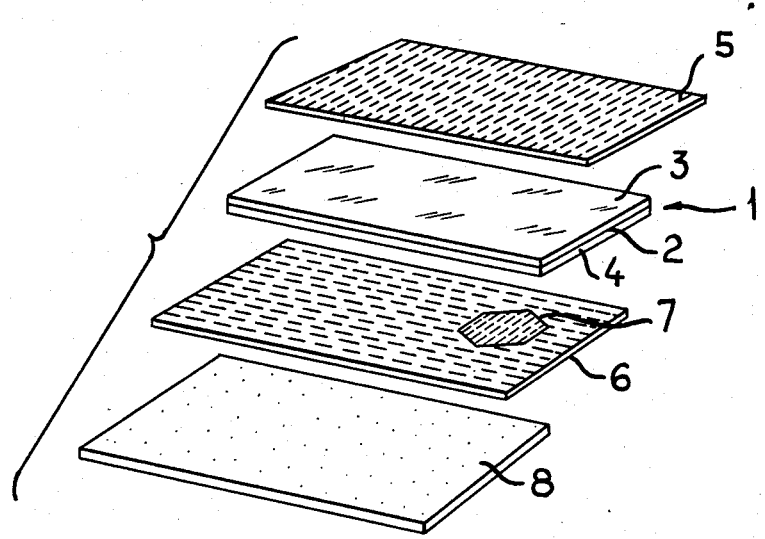
FIG. 2 shows a perspective view of the present invention.

The numeral 1 shows a liquid crystal panel composed of first and second glass plates 3 and 4 for mounting a liquid crystal material 2. A polarizing axis of first and second polarizing plates 5 and 6 are different by 90° respectively. As indicated by the dotted line in FIG. 2, a minor polarizing portion 7 of hexagonal shape having a different polarizing axis than the major portion of said polarizing plate 6 namely a same axis as said polarizing plate 5 is shaped at one part of said polarizing plate 6. Further a reflecting plate 8 is mounted under said polarizing plate 6. The digital pattern for a time display is shaped to conform to said glass plates 3 and 4 of said liquid crystal panel 1 (although not shown in Figures), and said polarizing plates 5 and 6, liquid crystal panel and reflecting plate 8 are respectively stacked upon each other in the order shown in FIG. 2.

Figure 3:
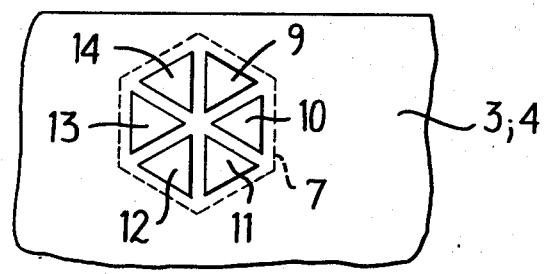
FIG. 3 shows an enlarged partial flat plan view in FIG. 2.

FIG. 3 shows a pattern for displaying sixty seconds, and shows a stacked condition of first to sixty electrodes 9-14 and said polarizing portion 7. As shown, the plurality of wedge shaped electrodes 9-14 are in registration with the hexagonal portion 7.

Namely, said first to sixty electrodes 9-14 each correspond to ten seconds respectively.

Referring now to the operation of the present invention:

Each of the digit numerals (not shown in FIG. 2) of said glass plates 3 and 4 are selectively displayed by the black color according to the application of electrical power signals thereto. In the polarizing portion 7 mounted on said second polarizing plate 6, the direction of the polarizing axis is different from the polarizing axis of said second polarizing plate 6 whereby the portions corresponding to said electrodes 9-14 become black when an electric field is not applied to said electrodes 9-14. The electrodes 9-14 are sequentially changed from black to a transparent condition by applying an electric field sequentially to the electrodes 9-14.

In the conventional type display, said electrodes become transparent when the electric field is not applied thereto, and said electrodes become black when the electric field is applied thereto. However, it is possible to obtain a new display effect by using a construction opposite to the conventional construction.

In the case of employing a polarizing portion 7 as indicated in FIG. 3, the whole portion is displayed black when the electric field is not applied thereto. The electrodes 9-14 are respectively and sequentially changed from black to the transparent condition whenever ten-second successive intervals have elapsed whereby the entire minor region in registration with said electrodes 9-14 becomes black when 60-seconds elapsed.

Figure 4:
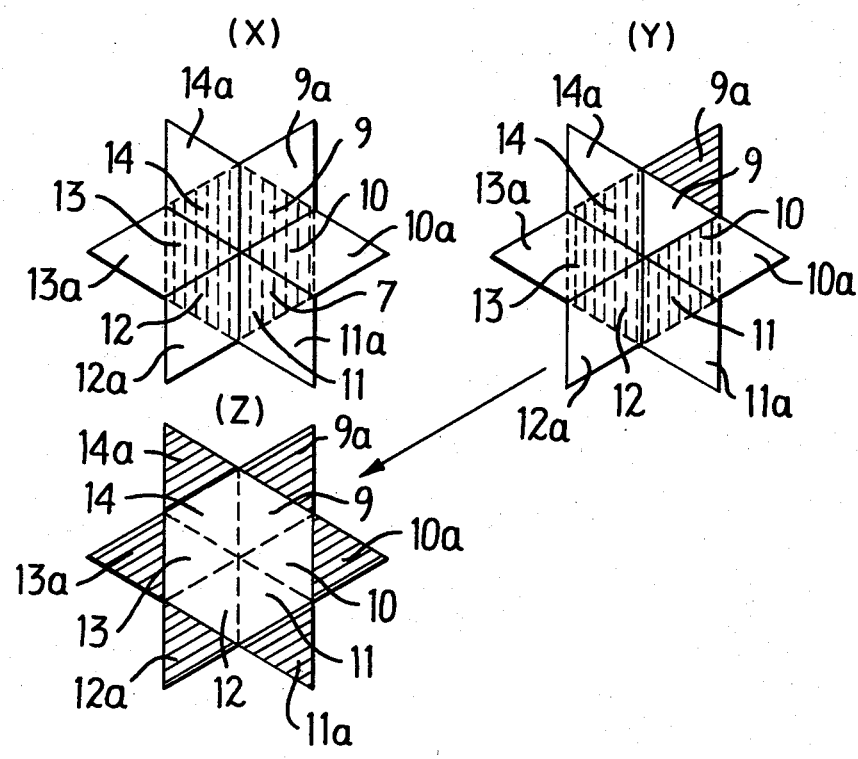
FIG. 4 shows another embodiment of the present invention.

FIG. 4 shows the other embodiment of the present invention, wherein said electrodes 9-14 are diamond-shaped and have the elongated portions 9a-14a which extend beyond polarizing portions 7. In the displaying condition of X, said polarizing portions 7 namely said electrodes 9-14 become black. Subsequently said polarizing portions 7 underlying said electrodes 9-14 become transparent whenever ten-seconds have elapsed as indicated in Y and Z. Further when sixty seconds have elapsed, the display condition is changed from Z to X.

According to the present invention, it is possible to obtain a separate second display by employing said minor polarizing portion at one part of said display device whereby an interesting display condition is easily obtained.

The present invention is not limited to the precise details of the present embodiment, and it is possible to obtain another embodiment, for example, said minor polarizing portion can be formed in the first polarizing plate 5 rather than in the second polarizing plate 6 as shown.

I claim:

1. A display device, comprising: first and second glass plates disposed in a stacked condition for defining a liquid crystal panel unit; liquid crystal material disposed between said first and second glass plates and responsive to an electrical field applied thereto for changing polarization of light passing through said liquid crystal material; first and second polarizing plates respectively disposed above and below said liquid crystal panel unit and in a stacked condition therewith, said first and said second polarizing plates having respective polarizing axes having relative orientations differing by 90°, and said second polarizing plate having a hexagonal shaped minor region having a polarizing axis oriented parallel to the polarizing axis of said first polarizing plate and differing by 90° from the polarizing axis of the major portion of said second polarizing plate; six wedge-shaped electrodes disposed symmetrically in a hexagonal pattern on said liquid crystal panel unit in registration with said hexagonal shaped minor region of said second polarizing plate for receiving electrical potentials to apply to said liquid crystal material in registration with said hexagonal shaped minor region electrical fields independent of an electrical field applied to the remainder of said liquid crystal material for independently controlling the light transmissive properties of the portion of the stacked combination of said liquid crystal panel unit and said first and second polarizing plates that is in registration with said hexagonal shaped minor region; and a reflecting plate disposed opposite one of said polarizing plates.

2. A display device, comprising: first and second glass plates disposed in a stacked condition for defining a liquid crystal panel unit; liquid crystal material disposed between said first and second glass plates and responsive to an electrical field applied thereto for changing polarization of light passing through said liquid crystal material; first and second polarizing plates respectively disposed above and below said liquid crystal panel unit and in a stacked condition therewith, said first and said second polarizing plates having respective polarizing axes having relative orientations differing by 90°, and said second polarizing plate having a hexagonal shaped minor region having a polarizing axis oriented parallel to the polarizing axis of said first polarizing plate and differing by 90° from the polarizing axis of the major portion of said second polarizing plate; six diamond-shaped electrodes disposed symmetrically in a star pattern having points extending beyond said hexagonal minor region on said liquid crystal panel unit in registration with said hexagonal shaped minor region of said second polarizing plate for receiving electrical potentials to apply to said liquid crystal material in registration with said hexagonal shaped minor region electrical fields independent of an electrical field applied to the remainder of said liquid crystal material for independently controlling the light transmissive properties of the portion of the stacked combination of said liquid crystal panel unit and said first and second polarizing plates that is in registration with said hexagonal shaped minor region; and a reflecting plate disposed opposite one of said polarizing plates.

* * * * *